US007123760B2

(12) United States Patent
Mullick et al.

(10) Patent No.: US 7,123,760 B2
(45) Date of Patent: Oct. 17, 2006

(54) METHOD AND APPARATUS FOR REMOVING OBSTRUCTING STRUCTURES IN CT IMAGING

(75) Inventors: Rakesh Mullick, Bangalore (IN); Vidya Pundalik Kamath, Bangalore (IN); Yogisha Mallya, Bangalore (IN)

(73) Assignee: General Electric Company, Niskayuna, NY (US)

( * ) Notice: Subject to any disclaimer, the term of this patent is extended or adjusted under 35 U.S.C. 154(b) by 717 days.

(21) Appl. No.: 10/301,018

(22) Filed: Nov. 21, 2002

(65) Prior Publication Data

US 2004/0101183 A1 May 27, 2004

(51) Int. Cl.
G06K 9/00 (2006.01)
(52) U.S. Cl. .......................... 382/131; 382/274; 378/21
(58) Field of Classification Search ........ 382/128–134, 382/156, 168, 170, 171, 172, 191, 203, 209, 382/237, 254, 257, 260, 274, 285, 299; 378/4, 378/8, 21, 23; 600/437, 425
See application file for complete search history.

(56) References Cited

U.S. PATENT DOCUMENTS

| | | | | |
|---|---|---|---|---|
| 5,570,404 A | * | 10/1996 | Liang et al. | 378/8 |
| 5,832,134 A | * | 11/1998 | Avinash et al. | 382/257 |
| 6,011,862 A | * | 1/2000 | Doi et al. | 382/132 |
| 6,393,090 B1 | * | 5/2002 | Hsieh et al. | 378/4 |
| 6,406,428 B1 | * | 6/2002 | Mittelstaedt | 600/437 |
| 6,424,730 B1 | * | 7/2002 | Wang et al. | 382/128 |
| 6,842,638 B1 | * | 1/2005 | Suri et al. | 600/425 |

OTHER PUBLICATIONS

Henk W. Venema, et al, CT Angiography of the Circle of Willis and Intracranial Internal Carotid Arteries: Maimum Intensity Projection with Matched Mask Bone Elimination—Feasibility Study; Radiology. 2001;218:893-898; RSNA, 2001.
Changjiang Yan et al., Extraction of Blood Vessel in CT Angiography Image Aided by Fuzzy Logic; Proceedings of ICSP2000; pp. 926-929; 2000 IEEE.
Alyssin & Avinash, Semi-Automatic Bone Removal Technique from CT Angiography Data; GE Research & Development Center; GE Medical Systems.
Carl-Fredrik Westin et al., Using Local 3D Structure for Segmentation of Bone from Computer Tomography Images; pp. 794-800; 1997 IEEE.
C-F Westin et al., Tensor Controlled Local Structure Enhancement of CT Images for Bone Segmentation; http://splweb.bwh.harvard.edu:8000/pages/papers/westin/miccai98/miccai98html.html.
Gunter Bohm et al., Three-Dimensional Segmentation of Bone Structures in CT Images; SPIE 3661: 0277-786X/99, 1999.
Punam K. Saha et al., Automatic Bone-Free Rendering of Cerebral Aneurysms Via 3D-CTA; Proc. SPIE vol. 4322: 1264-1272; 2001.

* cited by examiner

Primary Examiner—Kanjibhai Patel
Assistant Examiner—Seyed Azarian
(74) Attorney, Agent, or Firm—Fletcher Yoder

(57) ABSTRACT

A technique is provided for automatically identifying regions of bone or other structural regions within a reconstructed CT volume data set. The technique identifies and labels regions within the data set and computes various statistics for the regions. A rule-based classifier processes the statistics to classify each region. Incidental connections between disparate regions are eliminated. A structure mask, such as a bone mask, is then constructed after exclusion of regions of interest, such as a vascular map. The structure mask may then be used to construct a volume rendering free of the structure, such as bone-free.

76 Claims, 9 Drawing Sheets

METHOD AND APPARATUS FOR REMOVING OBSTRUCTING STRUCTURES IN CT IMAGING

BACKGROUND OF THE INVENTION

The present invention relates generally to the field of medical imaging and in particular to the field of Computed Tomography (CT). Specifically, the invention relates to a technique for segmenting an acquired image data set and for removing obstructing structures, such as bone, from the acquired image.

CT imaging systems measure the attenuation of X-ray beams passed through a patient from numerous angles. Based upon these measurements, a computer is able to reconstruct images of the portions of a patient's body responsible for the radiation attenuation. As will be appreciated by those skilled in the art, these images are based upon separate examination of a series of angularly displaced cross sections. A CT system produces data that represent the distribution of linear attenuation coefficients of the scanned object. The data are then reconstructed to produce an image which is typically displayed on a computer workstation, and may be printed or reproduced on film. A virtual 3-D image may also be produced by a CT examination.

CT scanners operate by projecting fan-shaped or cone-shaped X-ray beams from an X-ray source. The beams are collimated and pass through the object, such as a patient, that is then detected by a set of detector elements. The detector element produces signals based on the attenuation of the X-ray beams, and the signals are processed to produce data that represent the line integrals of the attenuation coefficients of the object along the ray paths. These data or signals are typically called projections. By using reconstruction techniques, such as filtered backprojection, useful images are formulated from the projections. The locations of features of interest, such as pathologies, may then be located either automatically, such as by a computer assisted diagnosis algorithm or, more conventionally, by a trained radiologist.

The relative opacity of some structures, such as bone, to the X-rays employed in CT scanning may obstruct regions of interest from certain perspectives. For example, in CT angiography (CTA) the skeletal system may significantly hinder the visibility of critical vascular structures in the desired three-dimensional renderings. To address this problem, a structure or region mask, such as a bone mask, may be constructed. The mask may then be subtracted from the image, allowing the radiologist or technician to view the region of interest from the desired viewpoint without obstruction.

Construction of the structure mask, however, is not a trivial task and may require both complex algorithms as well as user intervention. This user intervention can lead to undesirable delays as well as to inter- and intra-user variability in the construction of the structure masks.

However various factors may complicate the fully automated construction of a structure mask by computer-implemented algorithm. For example, in the case of bone, overlapping image intensities, close proximity of imaged structures, and limited detector resolution may make the automated separation of structures difficult. In particular, the proximity of vascular structures and bone along the vertebra and near the pelvis make segmentation an exceedingly complex task for computer-based algorithms.

Other factors may also contribute to the problems associated with generating a mask by automated routine, such as the anatomic and pathological variability which exists in the patient population. Examples of such patient variability include the presence of vessels with calcified plaque deposits and the presence of interventional devices such as stents, both of which may confuse automated segmentation algorithms. These various factors contribute both to inadequacies in the structure masks which are derived and to a need for undesired and time-consuming human intervention in forming the masks. Among the benefits which may be realized by fully automating the formation of structure masks is the potential for real-time structure removal. Real-time structure removal may allow a technician to perform certain useful functions, such as to adjust the location or field of view of the scan, to optimize the bolus and timing of the introduction of the contrast agent, and to minimize the dose exposure to the patient.

There is a need therefore, for an improved technique for deriving a structure mask, such as a bone mask, preferably with little or no human intervention.

BRIEF DESCRIPTION OF THE INVENTION

The present technique provides a novel approach to automatically identify and classify regions, such as bone regions, within a reconstructed CT volume data set. Classification is accomplished automatically by application of a rule-based classifier to statistical data computed for each region. A mask may then be automatically constructed of the regions based on classification, and the masked regions may then be excluded from the data set, allowing volume reconstructions to be formed without displaying the mask regions.

In accordance with one aspect of the technique, a method is provided for automatically identifying one or more structural regions in a volume imaging slice. The aspect provides for acquiring a volume imaging slice. Two or more regions within the volume imaging slice are labeled to form a labeled slice and the interior of each region of the labeled slice is flood-filled to form a flood-filled slice. A distance map of each region of the flood-filled slice is computed and one or more statistics for each region are computed using at least one of the volume imaging slice, the distance map, and the flood-filled slice. A rule-based classifier is applied to the one or more statistics for each region to classify each region as one of bone, vessel, and indeterminate.

In accordance with another aspect of the technique, a method is provided for automatically classifying a region. The aspect provides for applying a rule-based classifier to a set of statistics derived for a region of an image slice. The rule-based classifier classifies the region as one of bone, vessel, and indeterminate.

In accordance with a further aspect of the technique, a method is provided for constructing a three-dimensional bone map. The method provides for identifying one or more bone-labeled regions in a plurality of image slices. A connectivity analysis is performed for the one or more bone-labeled regions in each image slice to determine if each bone-labeled region in the image slice is connected to a respective region in one or more proximate slices. The bone-labeled regions which fail the connectivity analysis are re-classified as non-bone regions. A three-dimensional bone map comprising the remaining bone-labeled regions is constructed.

In accordance with another aspect of the technique, a CT imaging system is provided which includes an X-ray source configured to emit a stream of radiation and a detector array configured to detect the stream of radiation. The system also includes a system controller comprising an X-ray controller, a motor controller, and a data acquisition system, wherein the system controller controls the X-ray source and receives signal data from the detector array and a computer operably connected to the system controller and to memory circuitry. An operator workstation is operably connected to the computer and at least one of a printer and a display is connected to the operator workstation. At least one of the system controller and the computer is configured to label two or more regions within a volume imaging slice, to flood-fill the interior of each labeled region, and to compute a distance map of each flood-filled region. In addition, the at least one of the system controller and the computer is further configured to compute one or more statistics for each region using at least one of the volume imaging slice, the distance map, and the flood-filled region and to apply a rule-based classifier to the one or more statistics for each region to classify each region as one of bone, vessel, and indeterminate.

In accordance with an additional aspect of the technique, a CT imaging system is provided which includes an X-ray source configured to emit a stream of radiation and a detector array configured to detect the stream of radiation. The system also includes a system controller comprising an X-ray controller, a motor controller, and a data acquisition system, wherein the system controller controls the X-ray source and receives signal data from the detector array. A computer is operably connected to the system controller and to memory circuitry. An operator workstation is operably connected to the computer and at least one of a printer and a display is connected to the operator workstation. At least one of the system controller and the computer is configured to apply a rule-based classifier to a set statistics derived for a region of an image slice. The rule-based classifier classifies the region as one of bone, vessel, and indeterminate.

In accordance with a further aspect of the technique, a CT imaging system is provided which includes an X-ray source configured to emit a stream of radiation and a detector array configured to detect the stream of radiation. The system also includes a system controller comprising an X-ray controller, a motor controller, and a data acquisition system. The system controller controls the X-ray source and receives signal data from the detector array. A computer is operably connected to the system controller and to memory circuitry. An operator workstation is operably connected to the computer and at least one of a printer and a display is connected to the operator workstation. At least one of the system controller and the computer is configured to identify one or more bone-labeled regions in a plurality of image slices and to perform a connectivity analysis for the one or more bone-labeled regions in each image slice to determine if each bone-labeled region in the image slice is connected to a respective region in one or more proximate slices. The at least one of the system controller and the computer is further configured to re-classify bone-labeled regions which fail the connectivity analysis as non-bone regions and to construct a three-dimensional bone map comprising the remaining bone-labeled regions.

In accordance with another aspect of the technique, a CT imaging system is provided which includes an X-ray source configured to emit a stream of radiation and a detector array configured to detect the stream of radiation. The system also includes a system controller comprising an X-ray controller, a motor controller, and a data acquisition system, wherein the system controller controls the X-ray source and receives signal data from the detector array. A computer is operably connected to the system controller and to memory circuitry. An operator workstation is operably connected to the computer, and at least one of a printer and a display is connected to the operator workstation. At least one of the system controller and the computer includes a means for automatically identifying one or more bone regions in a reconstructed volume data set.

In accordance with an additional aspect of the technique, a CT imaging system is provided which includes an X-ray source configured to emit a stream of radiation and a detector array configured to detect the stream of radiation. The system also includes a system controller comprising an X-ray controller, a motor controller, and a data acquisition system, wherein the system controller controls the X-ray source and receives signal data from the detector array. A computer is operably connected to the system controller and to memory circuitry. An operator workstation is operably connected to the computer and at least one of a printer and a display is connected to the operator workstation. At least one of the system controller and the computer includes a means for automatically classifying a region in a reconstructed volume data set as one of bone, vessel, and indeterminate.

In accordance with a further aspect of the technique, a CT imaging system is provided which includes an X-ray source configured to emit a stream of radiation and a detector array configured to detect the stream of radiation. The system also includes a system controller comprising an X-ray controller, a motor controller, and a data acquisition system, wherein the system controller controls the X-ray source and receives signal data from the detector array. A computer is operably connected to the system controller and to memory circuitry. An operator workstation is operably connected to the computer and at least one of a printer and a display is connected to the operator workstation. At least one of the system controller and the computer includes a means for automatically constructing a three-dimensional bone mask.

In accordance with an additional aspect of the technique, a tangible medium is provided for automatically identifying one or more structural regions in a volume imaging slice. The tangible medium includes a routine for acquiring a volume imaging slice and a routine for labeling two or more regions within the volume imaging slice to form a labeled slice. The tangible medium also includes a routine for flood-filling the interior of each region of the labeled slice to form a flood-filled slice, and a routine for computing a distance map of each region of the flood-filled slice. In addition, the tangible medium includes a routine for computing one or more statistics for each region using at least one of the volume imaging slice, the distance map, and the flood-filled slice. A routine for applying a rule-based classifier to the one or more statistics for each region to classify each region as one of bone, vessel, and indeterminate is also included.

In accordance with an additional aspect of the technique, a tangible medium is provided for automatically classifying a region. The tangible medium includes a routine for applying a rule-based classifier to a set statistics derived for a region of an image slice. The rule-based classifier classifies the region as one of bone, vessel, and indeterminate.

In accordance with an additional aspect of the technique, a tangible medium is provided for constructing a three-dimensional bone map. The tangible medium includes a routine for identifying one or more bone-labeled regions in a plurality of image slices. In addition, the tangible medium includes a routine for performing a connectivity analysis for the one or more bone-labeled regions in each image slice to determine if each bone-labeled region in the image slice is connected to a respective region in one or more proximate slices. The tangible medium also includes a routine for re-classifying bone-labeled regions which fail the connectivity analysis as non-bone regions and a routine for constructing a three-dimensional bone map comprising the remaining bone-labeled regions.

BRIEF DESCRIPTION OF THE DRAWINGS

The foregoing and other advantages and features of the invention will become apparent upon reading the following detailed description and upon reference to the drawings in which.

DETAILED DESCRIPTION OF SPECIFIC EMBODIMENTS

Figure 1:
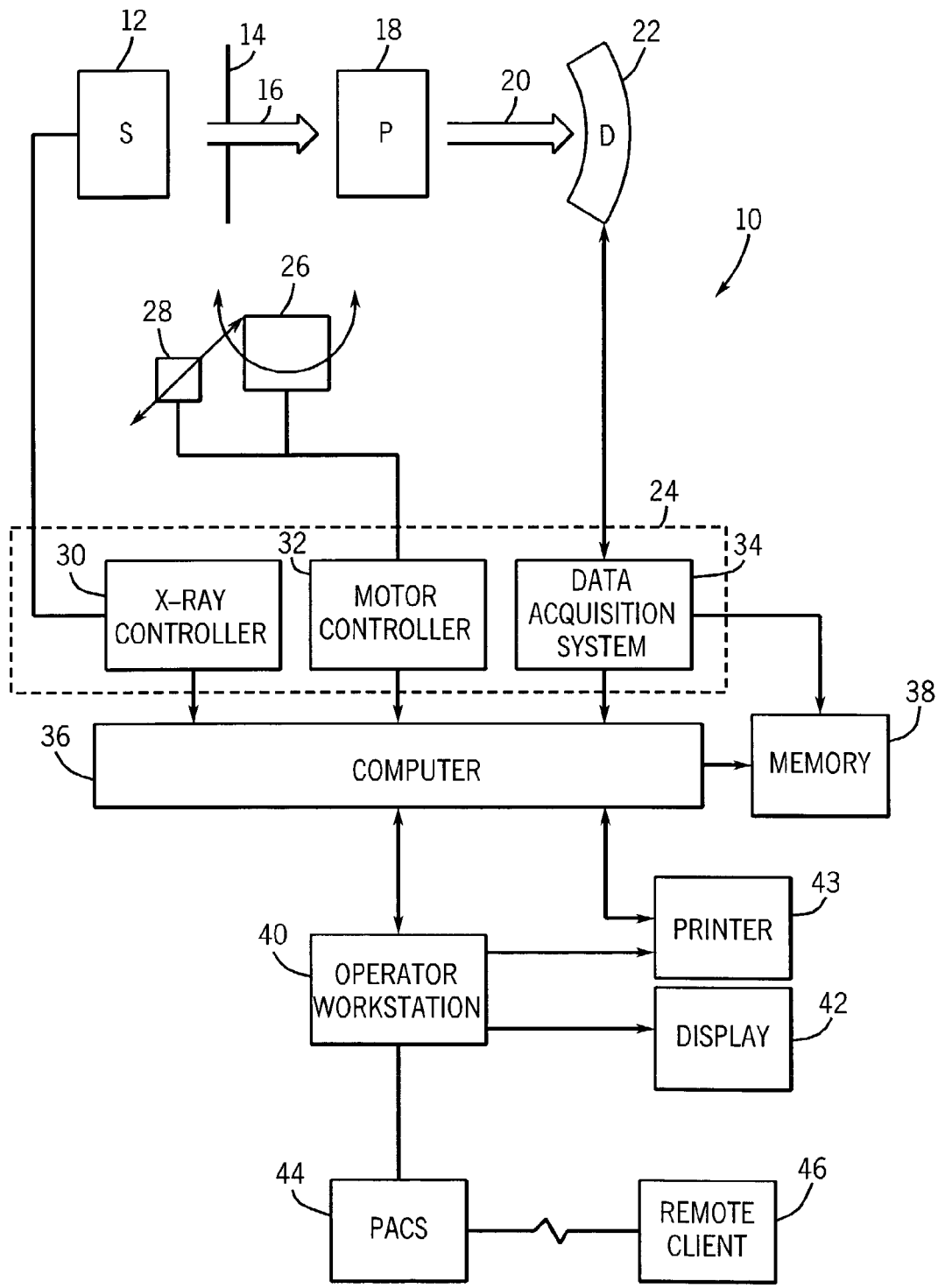
FIG. 1 is a diagrammatical view of an exemplary imaging system in the form of a CT imaging system for use in producing processed images in accordance with aspects of the present technique.

FIG. 1 illustrates diagrammatically an imaging system 10 for acquiring and processing image data. In the illustrated embodiment, system 10 is a computed tomography (CT) system designed both to acquire original image data and to process the image data for display and analysis in accordance with the present technique. In the embodiment illustrated in FIG. 1, imaging system 10 includes a source of X-ray radiation 12 positioned adjacent to a collimator 14. In this exemplary embodiment, the source of X-ray radiation source 12 is typically an X-ray tube.

Collimator 14 permits a stream of radiation 16 to pass into a region in which a subject, such as a human patient 18, is positioned. A portion of the radiation 20 passes through or around the subject and impacts a detector array, represented generally at reference numeral 22. Detector elements of the array produce electrical signals that represent the intensity of the incident X-ray beam. These signals are acquired and processed to reconstruct an image of the features within the subject.

Source 12 is controlled by a system controller 24 which furnishes both power and control signals for CT examination sequences. Moreover, detector 22 is coupled to the system controller 24, which commands acquisition of the signals generated in the detector 22. The system controller 24 may also execute various signal processing and filtration functions, such as for initial adjustment of dynamic ranges, interleaving of digital image data, and so forth. In general, system controller 24 commands operation of the imaging system to execute examination protocols and to process acquired data. In the present context, system controller 24 also includes signal processing circuitry, typically based upon a general purpose or application-specific digital computer, associated memory circuitry for storing programs and routines executed by the computer, as well as configuration parameters and image data, interface circuits, and so forth.

In the embodiment illustrated in FIG. 1, system controller 24 is coupled to a rotational subsystem 26 and linear positioning subsystem 28. The rotational subsystem 26 enables the X-ray source 12, collimator 14 and the detector 22 to be rotated one or multiple turns around the patient 18. It should be noted that the rotational subsystem 26 may include a gantry. Thus, the system controller 24 may be utilized to operate the gantry. The linear positioning subsystem 28 enables the patient 18, or more specifically a patient table, to be displaced linearly. Thus, the patient table may be linearly moved within the gantry to generate images of particular areas of the patient 18.

Additionally, as will be appreciated by those skilled in the art, the source of radiation may be controlled by an X-ray controller 30 disposed within the system controller 24. Particularly, the X-ray controller 30 is configured to provide power and timing signals to the X-ray source 12. A motor controller 32 may be utilized to control the movement of the rotational subsystem 26 and the linear positioning subsystem 28.

Further, the system controller 24 is also illustrated comprising a data acquisition system 34. In this exemplary embodiment, the detector 22 is coupled to the system controller 24, and more particularly to the data acquisition system 34. The data acquisition system 34 receives data collected by readout electronics of the detector 22. The data acquisition system 34 typically receives sampled analog signals from the detector 22 and converts the data to digital signals for subsequent processing by a computer 36.

The computer 36 is typically coupled to the system controller 24. The data collected by the data acquisition system 34 may be transmitted to the computer 36 and moreover, to a memory 38. It should be understood that any type of memory to store a large amount of data may be utilized by such an exemplary system 10. Also the computer 36 is configured to receive commands and scanning parameters from an operator via an operator workstation 40 typically equipped with a keyboard and other input devices. An operator may control the system 10 via the input devices. Thus, the operator may observe the reconstructed image and other data relevant to the system from computer 36, initiate imaging, and so forth.

A display 42 coupled to the operator workstation 40 may be utilized to observe the reconstructed image and to control imaging. Additionally, the scanned image may also be printed on to a printer 43 which may be coupled to the computer 36 and the operator workstation 40. Further, the operator workstation 40 may also be coupled to a picture archiving and communications system (PACS) 44. It should be noted that PACS 44 may be coupled to a remote system 46, radiology department information system (RIS), hospital information system (HIS) or to an internal or external network, so that others at different locations may gain access to the image and to the image data.

It should be further noted that the computer 36 and operator workstation 46 may be coupled to other output devices which may include standard or special purpose computer monitors and associated processing circuitry. One or more operator workstations 40 may be further linked in the system for outputting system parameters, requesting examinations, viewing images, and so forth. In general, displays, printers, workstations, and similar devices supplied within the system may be local to the data acquisition components or may be remote from these components, such as elsewhere within an institution or hospital, or in an entirely different location, linked to the image acquisition system via one or more configurable networks, such as the Internet, virtual private networks, and so forth.

Figure 2:
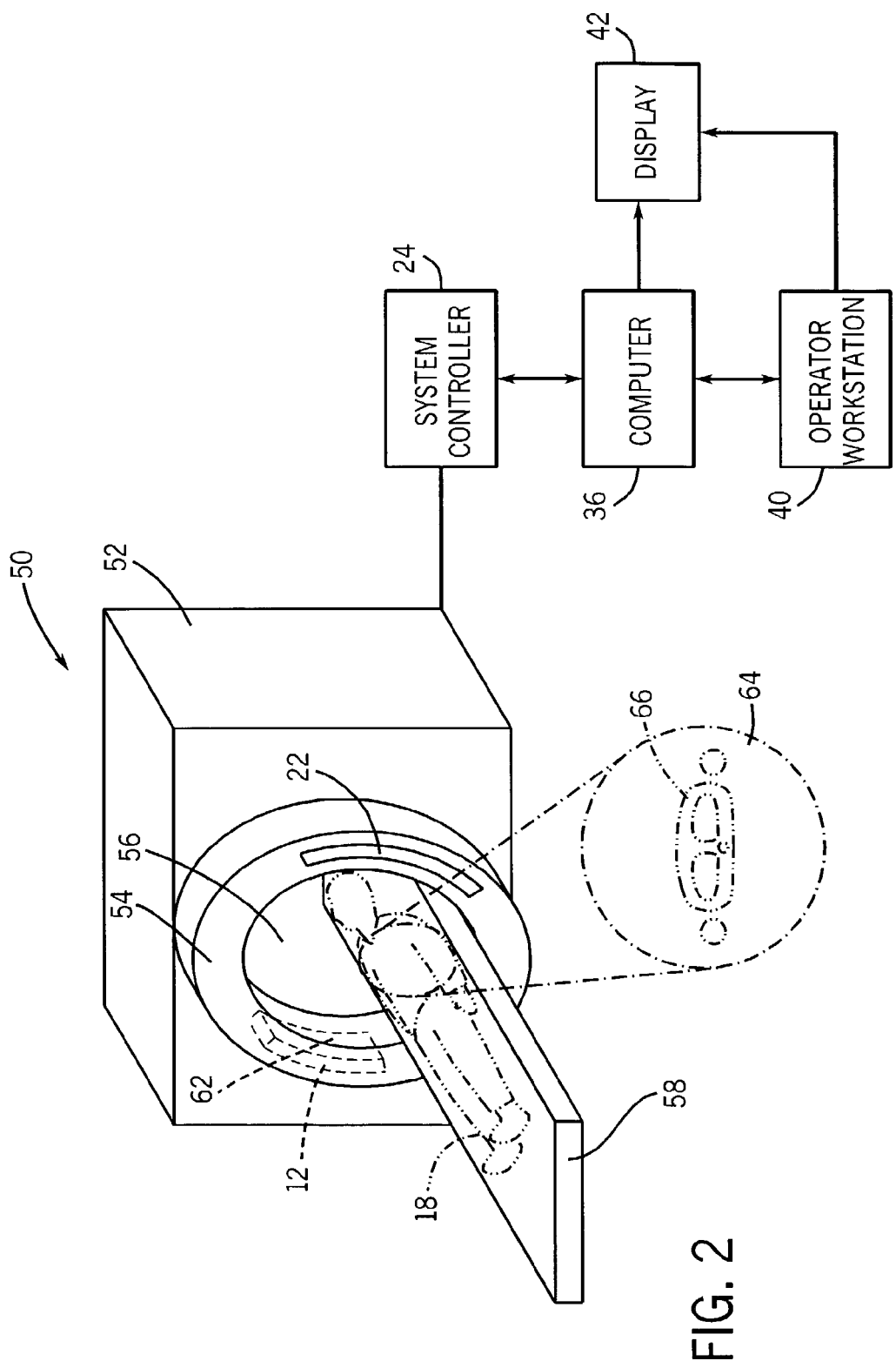
FIG. 2 is another diagrammatical view of a physical implementation of the CT system of FIG. 1.

Referring generally to FIG. 2, an exemplary imaging system utilized in a present embodiment may be a CT scanning system 50. The CT scanning system 50 is illustrated with a frame 52 and a gantry 54 that has an aperture 56. The aperture 56 may typically be 60 cm to 70 cm in diameter. Further, a patient table 58 is illustrated positioned in the aperture 56 of the frame 52 and the gantry 54. The patient table 58 is adapted so that a patient 18 may recline comfortably during the examination process. Additionally, the patient table 58 is configured to be displaced linearly by the linear positioning subsystem 28 (see FIG. 1). The gantry 54 is illustrated with the source of radiation 12, typically an X-ray tube which emits X-ray radiation from a focal point 62. The stream of radiation is directed towards a particular region of the patient 18. It should be noted that the particular region of the patient 18 is typically chosen by an operator so that the most useful scan of a region may be imaged.

In typical operation, X-ray source 12 projects an X-ray beam from the focal point 62 and toward detector array 22. The detector 22 is generally formed by a plurality of detector elements which sense the X-rays that pass through and around a subject of interest, such as particular body parts, for instance the liver, pancreas and so on. Each detector element produces an electrical signal that represents the intensity of the X-ray beam at the position of the element at the time the beam strikes the detector. Furthermore, the gantry 54 is rotated around the subject of interest so that a plurality of radiographic views may be collected by the computer 36. Thus, an image or slice is acquired which may incorporate, in certain modes, less or more than 360 degrees of projection, to formulate an image). The image is collimated to a desired thickness, typically between 0.5 mm and 10 mm using either lead shutters in front of the X-ray source 12 and different detector apertures 22. The collimator 14 (see FIG. 1) typically defines the size and shape of the X-ray beam that emerges from the X-ray source 12.

Thus, as the X-ray source 12 and the detector 22 rotate, the detector 22 collects data of the attenuated X-ray beams. Data collected from the detector 22 then undergo pre-processing and calibration to condition the data to represent the line integrals of the attenuation coefficients of the scanned objects. The processed data, commonly called projections, are then filtered and backprojected to formulate an image of the scanned area. As mentioned above, the computer 36 is typically used to control the entire CT system 10. The main computer that controls the operation of the system may be adapted to control features enabled by the system controller 24. Further, the operator workstation 40 is coupled to the computer 36 as well as to a display, so that the reconstructed image may be viewed.

Once reconstructed, the image produced by the system of FIGS. 1 and 2 reveals internal features of a patient. As illustrated generally in FIG. 2, the image 64 may be displayed to show these features, such as indicated at reference numeral 66 in FIG. 2. However some internal features may be obstructed by other structures such as the skeletal structure. In particular, views of internal organs and vasculature within the abdomen may, from certain perspectives, be blocked by bone in the reconstructed image. While bone is one example of a potential obstructing structure, other internal structures, such as musculature, may also obscure underlying organs, such as the liver, in the reconstruction.

One manner in which this problem may be addressed is structure masking. In structure masking, the voxels associated with an obscuring structure are identified and masked out of the reconstruction generated from the image data. Masking allows the image data associated with the obstructing structures to be subtracted from the image data set, and a volume image may then be reconstructed that provides an unobstructed view of the desired features. For example, if a region of bone obstructs an underlying organ or a region of vasculature, bone masking may be performed to remove all identified bone voxels from the image data. After bone masking, the resulting reconstructed volume image would not include the obstructing skeletal structures.

One problem which can arise in structure masking, however, occurs when the image intensities of the structures to be removed overlap with the image intensities of structures which are to remain, particularly when such structures are proximate to one another. Because of the number of slices which must be examined to identify the mask components, typically 150–1,500 for Computed Tomography angiography (CTA), it is highly desirable to minimize human involvement in the selection of image data to be masked, both for time and workload reasons. Segmentation algorithms employed to automatically select mask voxels, however, may have trouble distinguishing between mask and non-mask voxels where the image intensities overlap, requiring human intervention or producing imperfect masks.

For example, in the case of CTA, a radio-opaque contrast agent is typically introduced to increase the contrast of vascular structures, making them easier to discern. The dye-enhanced vessels, however, may have image intensities which overlap those of nearby bone regions. As a result, bone segmentation algorithms may err by either not including bone voxels among those to be masked or by including dye-enhanced vessel voxels in the mask region, thereby removing desired features from the reconstructed volume.

Figure 3:
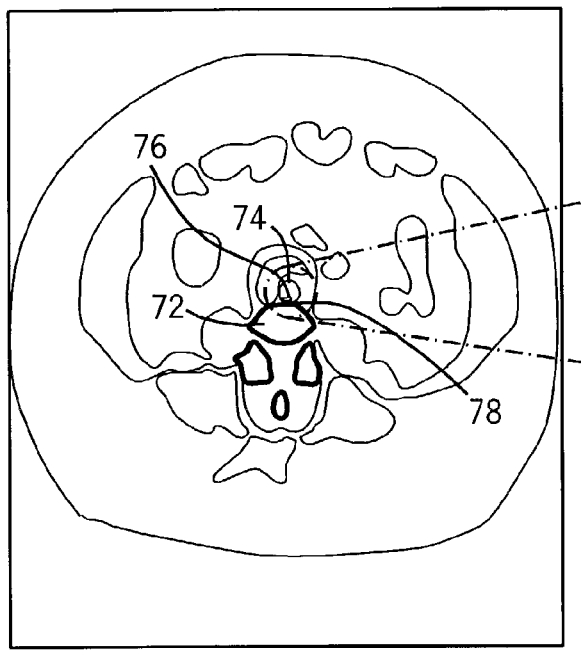
FIG. 3 is a representation of an axial cross-section of a patient displaying bridging between structures within a blown-up inset.

Referring now to FIG. 3, an exemplary image is depicted in which an abdomen 70 is shown in cross-section with an inset region, denoted by dotted lines, enlarged for greater detail. Within the enlarged area, a bone region 72, here a vertebra, is shown as is a nearby region of a vessel 74 which has been contrast enhanced, here a portion of the aorta. The vessel 74 may contain a calcification 76 which produces an image intensity which overlaps the intensity associated with the nearby vertebra 72. Due to the limits of image resolution in CT, and to the close proximity and similar intensity of the calcification 76 and the bone 72, a bridge region 78 may result which appears to connect the vessel 74 and the bone 72. This bridge region 78 and the apparent connection it suggests may confound a segmentation algorithm, particularly one which analyzes regions based upon connectivity. As a result, the voxels selected by bone segmentation for removal may include both the bridge region 78, calcification 76, or even the contrast-enhanced vessel 74, none of which should be removed. Indeed, in CTA, the vessel 74 and the calcification 76 are presumably among the very structures which a reviewing physician would wish to see.

Figure 4:
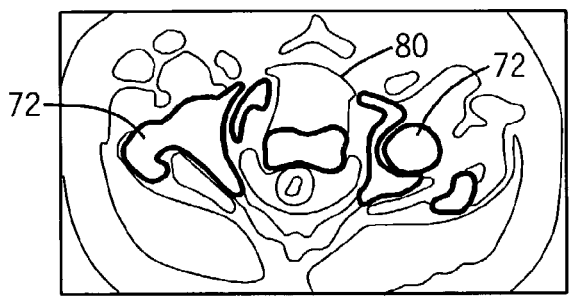
FIG. 4 is a representation of an axial cross-section of a patient displaying contrast enhancement of related circulatory organs.
Figure 5:
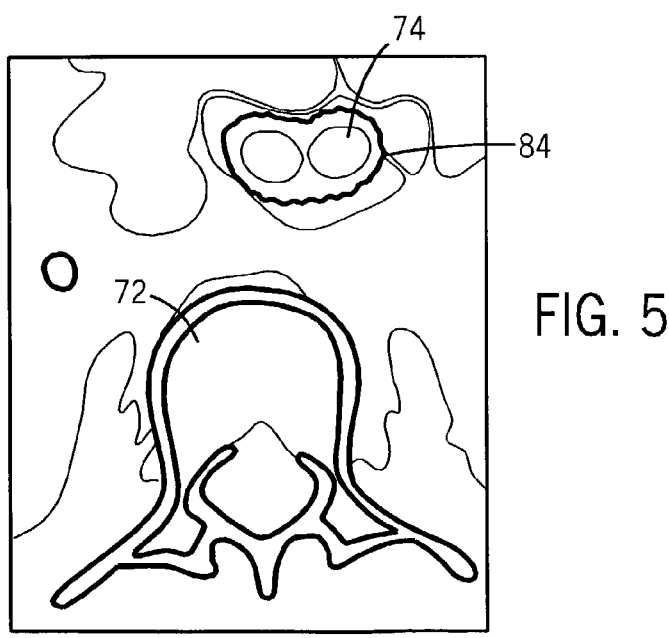
FIG. 5 is a representation of an axial cross-section of a patient displaying an interventional device.

Another example of a contrast agent related problem is depicted in FIG. 4, in which an abdominal cross-section is provided displaying a circulatory organ 80, here the bladder is depicted in the vicinity of two bone regions 72, here the pelvic girdle. As the contrast agent discharges in the body, it may collect in circulatory organs 80, such as the bladder, urethra, or kidney, producing a high-contrast region within the circulatory organ 80. The high-contrast region may be segmented and removed by an automated bone-masking algorithm, leading to inaccurate reconstructions of the patient anatomy.

In addition, interventional devices 84, such as stents, may be associated with vascular structures 74 in the region of interest. To the extent that the interventional device contains metal, such as the metal grid comprising a stent, metal artifacts may result. The metal artifacts in turn may confound bone segmentation algorithms, leading to the inadvertent and undesired removal of the portion of the vessel 74 containing the interventional device from the reconstructed image. Human intervention may prevent these errors, but only at the cost of increased time and effort.

Figure 6:
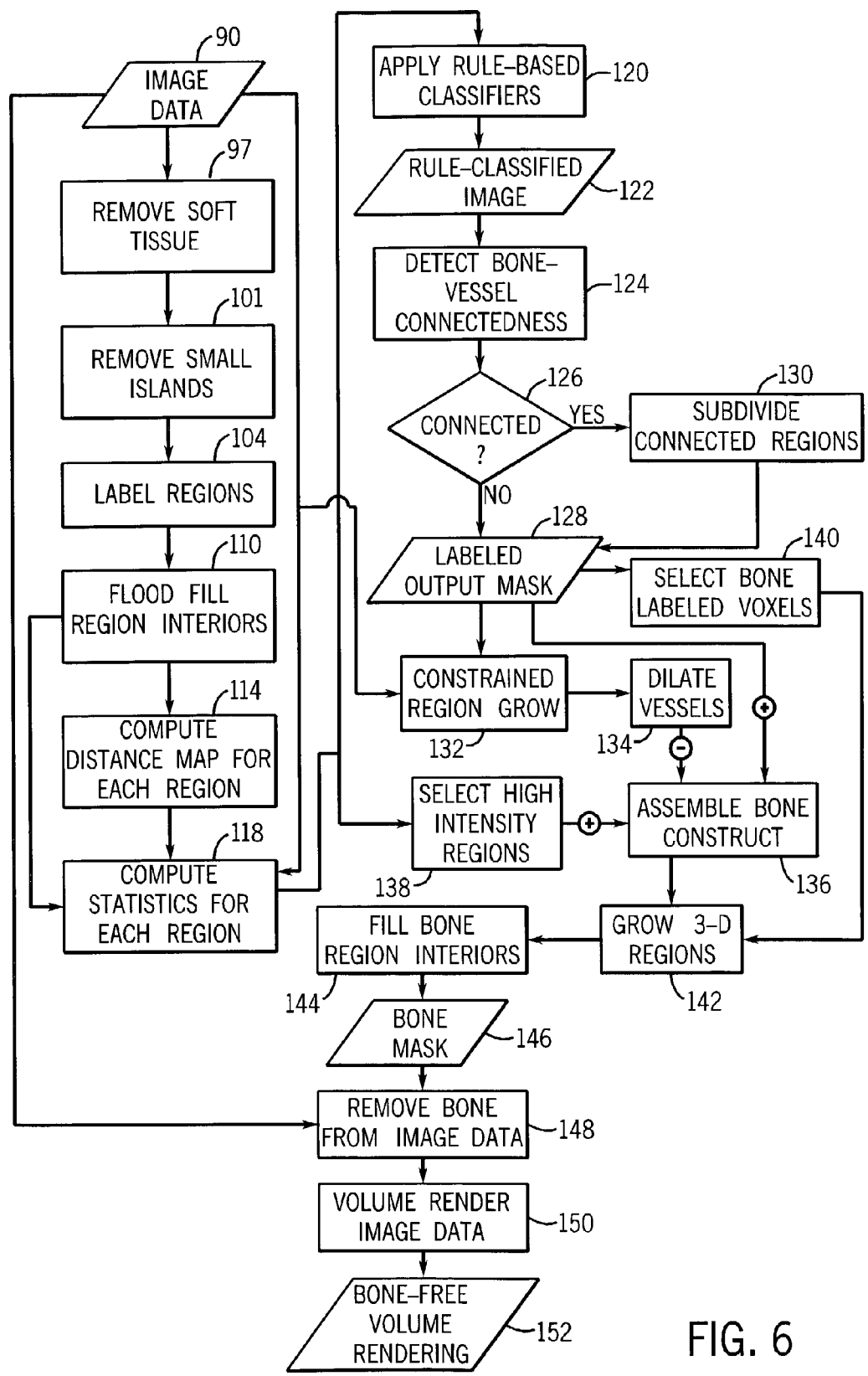
FIG. 6 is a flowchart depicting one embodiment of the present technique.

Instead, an automated method of structure masking which does not inadvertently remove regions of the structures of interest and which fully removes the obstructing structure is desired. One example of such a technique, optimized for bone masking, is depicted as a flowchart in FIG. 6. Though the process described in FIG. 6 is presented in terms of bone masking for simplicity, it should be understood that the technique encompasses the broader field of structure masking and that the discussed actions may be applied generally to structure masking.

In the present technique, the acquired image data 90, typically a reconstructed stack of axial slices formatted in the Digital Imaging and Communications In Medicine (DICOM) standard, is processed. In one embodiment, the in-plane resolution of the data varies between 0.55 mm and 0.88 mm with a reconstructed slice thickness range of 1.25 mm to 2.0 mm. In such an embodiment, a square stack may be 512×512 voxels. The image resolutions in each of the three dimensions may be recorded to help in monitoring and assessing information about structures in an exact physical measure. The image intensities associated with each slice may conform to a standard 16-bit brightness value.

Figure 7:
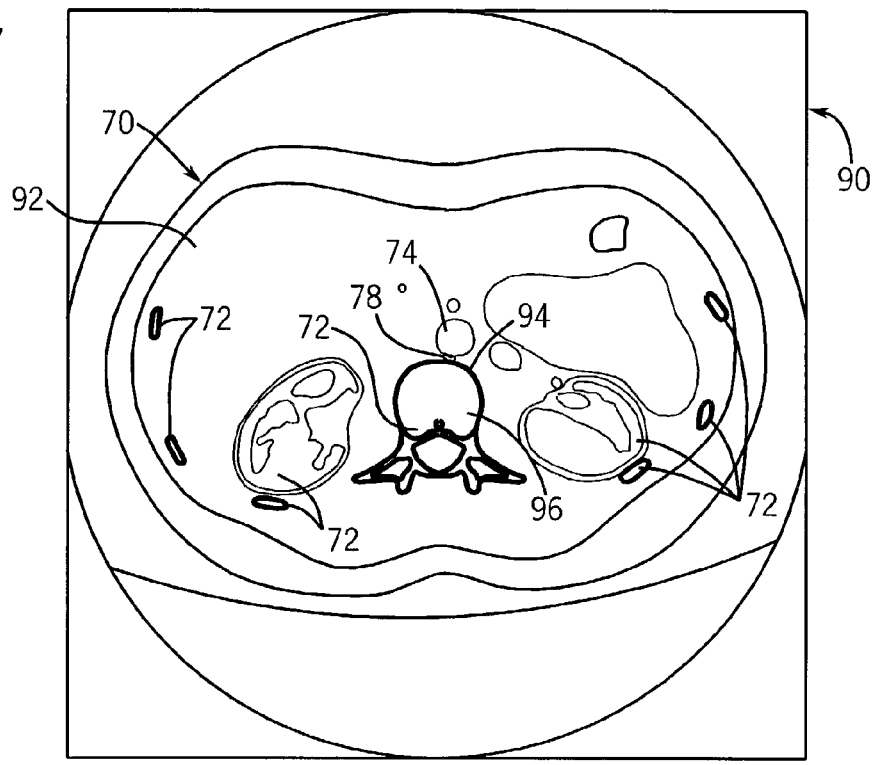
FIG. 7 is a representation of an axial cross-section of a patient constituting an unmasked reconstructed slice.

An example of the image data 90 is provided in FIG. 7, in the form of a line rendition of a reconstructed image that depicts an axial slice of an abdomen 70 including several bone regions 72, a vessel 74, as well as miscellaneous soft tissue 92. One of the bone regions is seen to include a periphery of dense calcified cortical bone 94 and an interior region of less dense, spongy trabecular bone 96. While FIG. 7 is presented in line form to simplify the presentation of material, actual slices will, of course, typically consist of a range of grey (or color) image intensities of various dynamic ranges.

Each slice of the image data 90 may be processed to exclude 97 the soft tissue 92 including the skin and fat. This soft tissue removal process may be accomplished by employing a simple image threshold and excluding all voxels with image intensities below this soft tissue threshold. For example, a soft tissue removal threshold value of 176 Hounsfield Units (HU) may be employed in one embodiment to provide significant separation between most bones 72 and contrast-enhanced vessels 74. In other embodiments, other empirically derived thresholds may be employed to provide the desired degree of bone 72 and vessel 74 separation.

Figure 8:
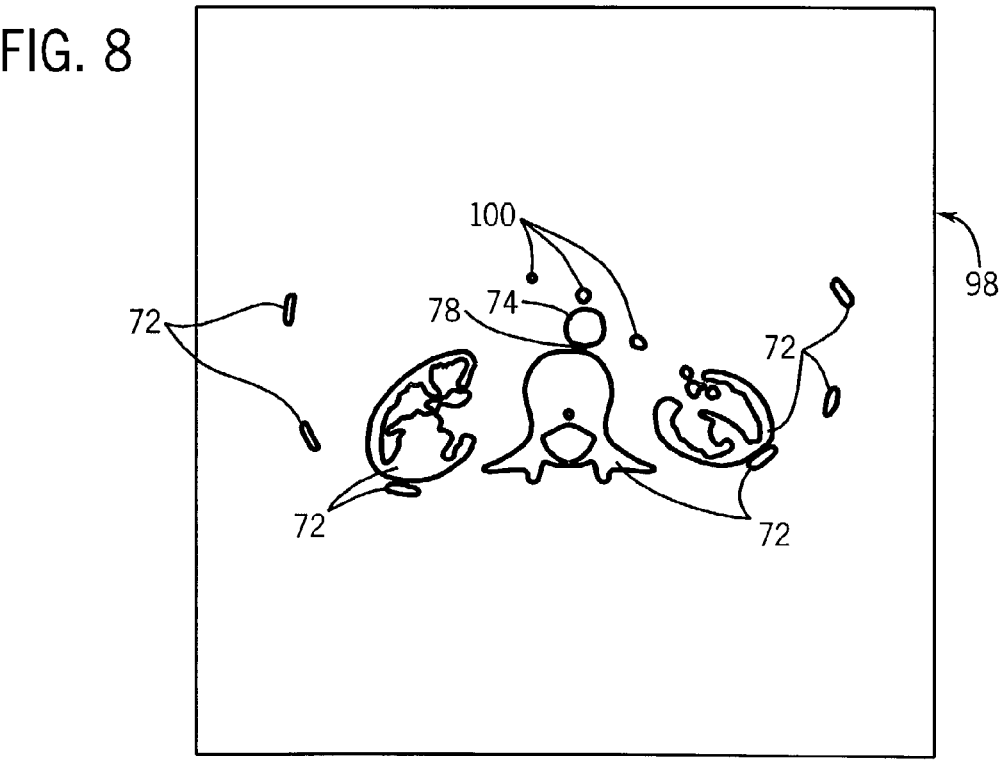
FIG. 8 is the slice of FIG. 7 after exclusion of soft tissues.
Figure 9:
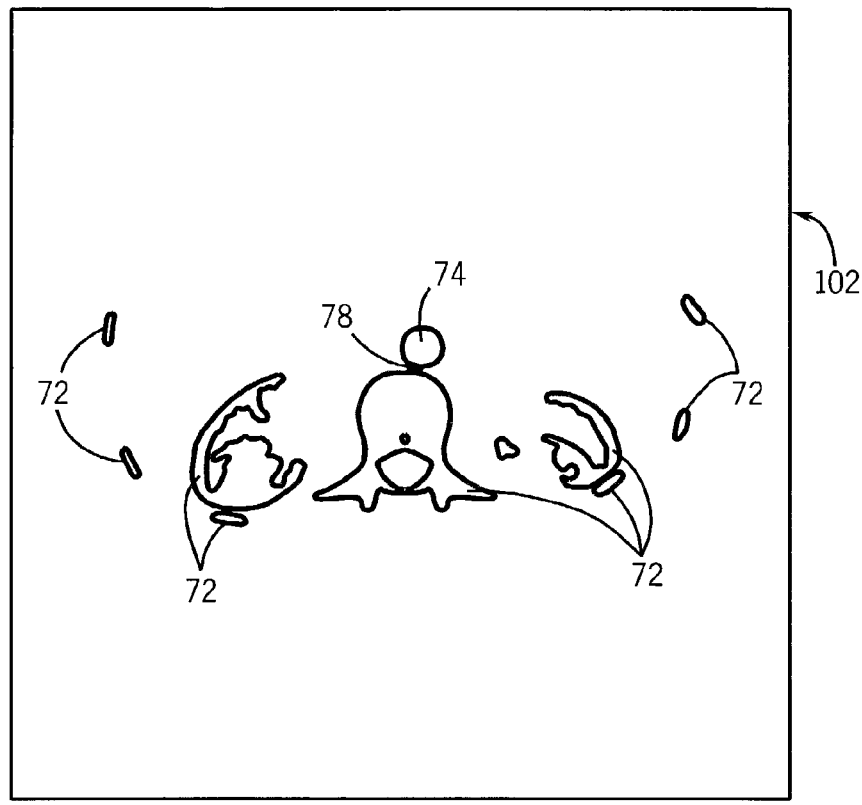
FIG. 9 is the slice of FIG. 8 after exclusion of small islands.

An example of a soft tissue excluded image 98 is provided in FIG. 8 which depicts the image data 90 after soft tissue removal 97. After the soft tissue 92 is removed, small islands 100 of tissue may remain which, due to reasons of local anatomy, are associated with intensity values above the soft tissue threshold. Such small islands 100 are too small to be regions of bone and may be present due to the presence of very small vessels or due to acquisition or reconstruction noise. Referring once again to FIG. 6, the soft tissue excluded image 98 may be processed to remove 101 any small islands 100 which are present to produce a noise-reduced image 102, depicted in FIG. 9. Removing 101 the small islands 100 may be accomplished by employing a size threshold, such as 20 mm$^2$, such that small regions below the size threshold are eliminated from each slice.

Figure 10:
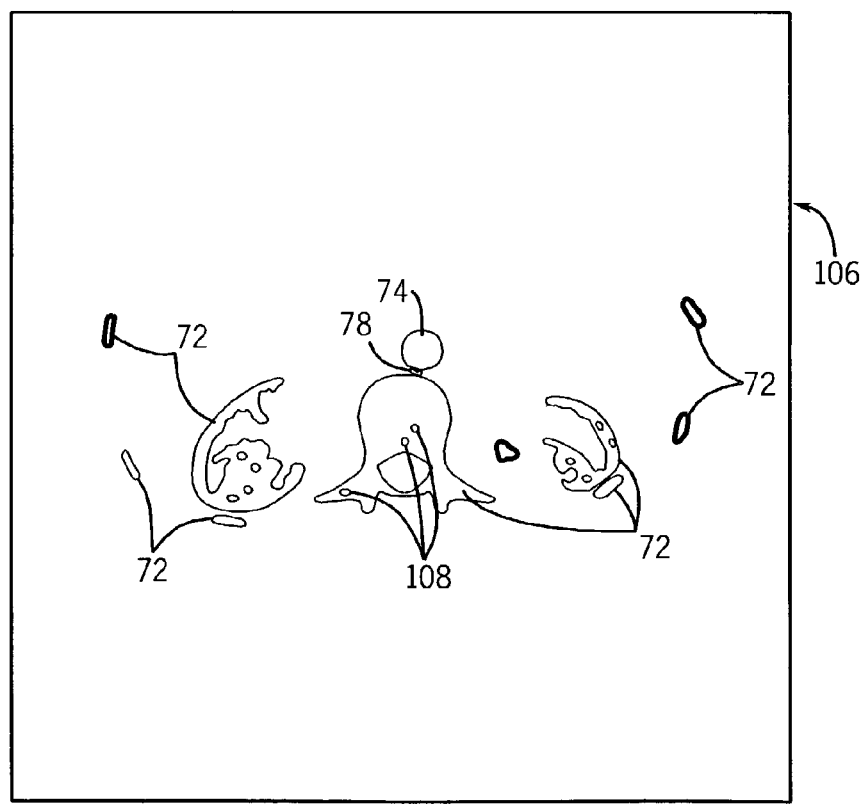
FIG. 10 is the slice of FIG. 9 after region labeling.

Each region remaining in the noise-reduced image 102 is then labeled, as indicated at reference numeral 104 in FIG. 6, using a connected component labeling algorithm which provides a unique label to all voxels which form a connected component, i.e., each contiguous region. A labeled image 106 is depicted in FIG. 10. Once labeled, each region is no longer associated with the mixture of image intensities from the original acquired data but is instead associated with a single image intensity within the region. That is, each voxel of a region is assigned an intensity value associated with that region such that the labeled region has a uniform intensity.

It can be observed that within the labeled image 106, holes or voids 108 may exist within some of the contiguous regions. The holes 108 may arise due to the differential image intensity generated by the relatively dense cortical bone 94 and the less dense trabecular bone 96 regions. In particular, due to the use of threshold limitations in previous steps, some regions of bone interior may have been incidentally discarded. The holes 108 may therefore prevent the identification, and therefore removal, of the entire bone cross-section within each slice.

Figure 11:
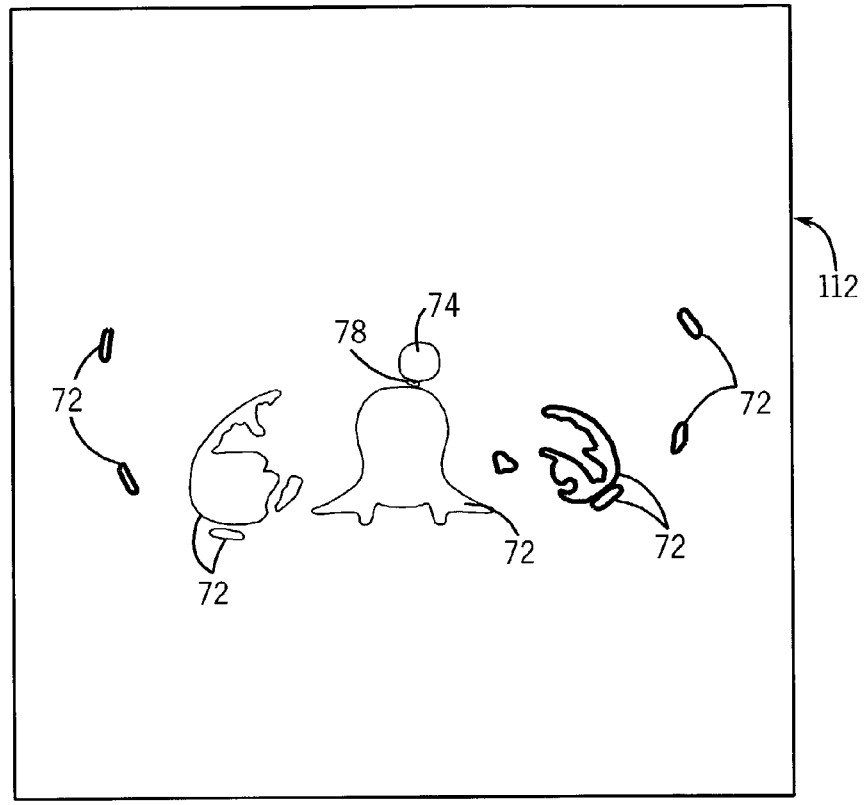
FIG. 11 is the slice of FIG. 10 after flood-filling of the regions.

To identify the entire bone cross-section and not just the cortical bone, the interior of each region in each slice may be completely filled. The labeled image 106 may therefore undergo a constrained flood-fill, as indicated by reference numeral 110 in FIG. 6, of the region interiors to produce a flood-filled image 112, as depicted in FIG. 11. The constrained-fill process 110 assigns the voxels comprising the holes 108 the same label and intensity as the surrounding voxels. This may be accomplished by iteratively applying an eight-way connectivity process which determines the interior status of each voxel comprising a hole 108 based upon its degree of connectivity with the a labeled region. The iterative process proceeds until all holes 108 are filled and labeled to coincide with the surrounding region.

Figure 12:
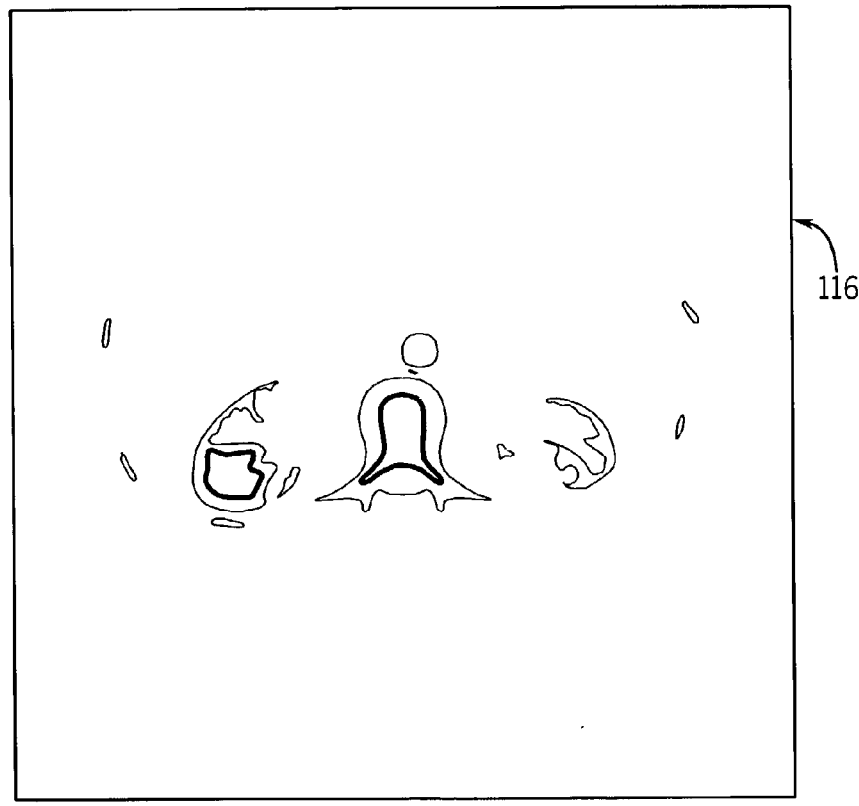
FIG. 12 is the slice of FIG. 11 after distance transformation.

After each region has been filled, a region-specific distance transform is computed at step 114 of FIG. 6, to form a distance-transformed image 116, as depicted in FIG. 12. In the depicted distance-transformed image 116, the distance of each voxel in a region from the nearest edge of the region is calculated. Each voxel in each region is assigned an intensity value corresponding to its distance from the nearest edge of its region. In the resulting image, voxel intensity increases the farther the voxel is from the nearest edge of the region. Voxel intensity, therefore, corresponds to the likelihood that the voxel is indeed part of the labeled region.

Various model-based statistics are then computed at step 118 of FIG. 6 for each region of each slice using the original image data 90, the flood-filled image 112, and the distance-transformed image 116. One example of a statistic which may be computed is the standard deviation of intensity values for each region, as determined by reference to the original image data 90 and the flood-filled image 112. The standard deviation may then be used to discern vessels 74 from bone 72 in cross-section. In particular, the lumen of a contrast-enhanced vessel 74 may have a substantially uniform intensity relative to bone 72 which may have high intensity on the periphery due to the presence of cortical bone 94 and low intensity on the interior due to the presence of trabecular bone 96. As a result, lower standard deviations may be associated with vessels 74 while higher standard deviations are indicative of bone 72.

Other statistics which may be computed for each region include area, mean intensity, the proportion of the region attributable to flood filling 110, the maximum distance to the periphery, the mean and standard deviation of intensity at a minimum distance in the distance-transformed image 116 (i.e., intensity at the region periphery), the mean and standard deviation of intensity at a maximum distance in the distance-transformed image 116 (i.e., intensity at the region interior), intensity covariance in the interior of the region at various angles, such as 0°, 45°, 90°, and 135°, the percentage of pixels within the region with high intensities, such as greater than 376 HU, the maximum intensity at a minimum distance in the distance transformed image, the mean and standard deviation radius of the region, and the local mean and standard deviation of image intensity along the region perimeter. Other statistics may, of course, be calculated. However, these examples are believed to be representative of the type of statistics which may be computed to test for such features as texture, leverage, and circularity which in turn may help distinguish bone 72 from vessels 74. To the extent that other structure masks may be created, such as a muscle mask, other statistics may be computed, such as statistics related to edge continuity or strength or conformance to an expected shape.

Upon calculation of the various statistics, a sequential rule-based classifier is applied at step 120 of FIG. 6 to the statistical results for each region to classify each region by structure type, such as vascular and bone regions. The sequential rule-based classifier may use various bone or vascular-identification criteria which can be assessed statistically to classify bone and vessel regions respectively. For example, the classification rules may include rules for classifying stented and calcified vessels, rules for identifying vessels, rules for identify bone, and rules for removing small regions labeled as bone which are too small to be bone or which are located where bone is generally not present. In this example, application of the rules to the statistics results in each region being classified as either bone, vessel, or indeterminate.

Figure 13:
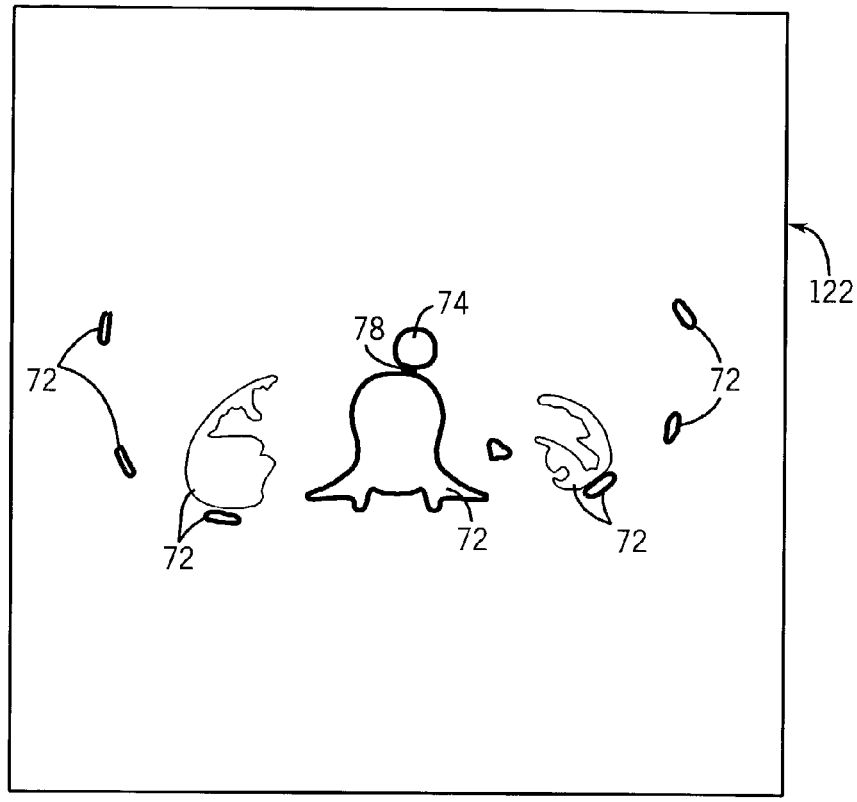
FIG. 13 is the slice of FIG. 11 after rule-based region classification.

In the above rule examples, identification of vessels may be by shape, as determined from the statistics, such as region size, circularity, or other image related statistics. Similarly, rules for bone identification may look at regions with a high standard deviation or with high mean and minimal standard deviation along the region periphery. Other statistics which may be indicative of bone include minimal standard deviation with a Fold, large regions with a large standard deviation, trabecular texture as determined by various measures of covariance, and low standard deviation with a high percentage calcification. After application of the classification rules, each region will be classified structurally, such as bone, vessel or indeterminate, as noted above. The classified regions comprise a rule-classified image 122, as depicted in FIG. 13, which may be further processed. The rule-based classification may be skewed toward classifying ambiguous regions conservatively to minimize false positives, i.e., labeling vessels as bone, which might lead to the accidental exclusion of vascular regions.

Figure 14:
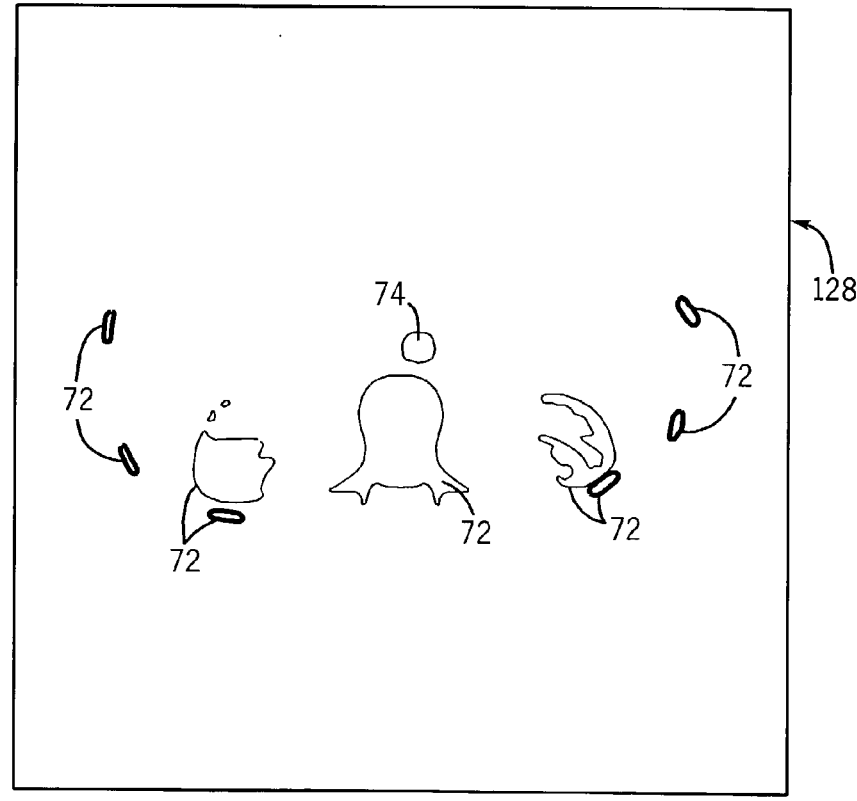
FIG. 14 is the slice of FIG. 13 after de-bridging.

Complex regions of the rule-classified image 122 may be analyzed at step 124 of FIG. 6 to detect bone-vessel connectedness, such as the bridge region 78 of FIG. 13. Bone-vessel regions which are not connected, as determined at decision block 126 in FIG. 6, are included in the labeled output mask 128, as depicted in FIG. 14. If, at decision block 126, a bone 72 and a vessel 74 region are determined to be connected, such as by a bridge region 78, the connected regions are subdivided at step 130 into two or more regions, i.e. the unconnected bone 72 region and the vessel region 74. The process of subdividing may be accomplished by using a de-bridging algorithm. For example, such an algorithm may shrink the labeled regions by eroding the peripheries until the regions are no longer connected. The subdivided regions are then included in the labeled output mask 128. In the labeled output mask 128, regions are labeled as either bone, vessel, or mixed, if not separable by de-bridging.

The classification of the labeled regions of the output mask 128 may be further assessed by comparison to the neighboring regions in adjacent or proximate slices. That is, the respective regions within the two preceding slices or the preceding and subsequent slices may be used to assess the classification of a region, thereby incorporating a third-dimension into the processing. For example, a constrained region-growing step 132 can be performed within the reconstructed slices on regions identified as vascular or circulatory, including organs such as the kidneys, urethra, bladder, etc. in addition to the vessels 74. The region-growing step 132 may occur by looking for contiguous regions labeled as vessels 74 within the adjacent or proximate slices to determine the three-dimensional circulatory structure. The region-growing step 132 occurs for each slice of the imaged volume using region-growing seeds from each region labeled as vessel. The region-growing may be limited by the maximum intensity of the seed pixels and by the range of intensities into which expansion may occur. That is, the region-growing step 132 may be constrained not to connect to regions labeled as bone or to regions which might appear as bone, i.e. high-intensity regions.

After the three-dimensional circulatory structure has been determined by region growing step 132, the vessels comprising the region may be dilated, as indicated at step 134, by supplementing the peripheral zone around the vessels. The step of dilation 134 acts to protect voxels in the neighborhood of the vessels from further processing or inclusion in the bone mask, thereby protecting the vessel structure as it has been determined. The step of vessel dilation 134, therefore, provides a protective buffer to prevent inclusion of vessel voxels into the bone mask in subsequent processing steps.

A bone construct is subsequently assembled at step 136 of FIG. 6 by combining the bone-labeled regions from the output mask 128 with any high intensity regions selected at step 138 from the original image data 90 and excluding the dilated vessel region, as previously determined. High intensity regions may be selected based upon some intensity threshold, such as 176 HU, and may include bone which has been incidentally discarded in processing. The bone construct is comprised of all regions within the set of image slices which might be bone, as determined by labeling and intensity and by excluding those regions determined to be vessel 74.

The bone-labeled regions of the output mask 128 are then selected at step 140 and, in combination with the bone construct assembled previously, are grown at step 142 as a three-dimensional bone structure to encompass probable or suspected bone regions. The bone-growing step 142 occurs for each slice of the imaged volume using region-growing seeds from each region labeled as bone. Growth of the three-dimensional bone region may be guided by the results of a three-dimensional connectivity analysis in which the respective bone regions 72 of proximate slices are compared to determine the presence or absence of the three-dimensional bone structure. As with vessel growing, neighboring regions in proximate slices may be used to determine the classification of a region as bone for inclusion in the three-dimensional bone structure.

The seeds for the growing algorithm may be based upon the prior bone classification results. The bone growing step 142 need not be constrained since the known vessel regions are protected due to their exclusion during assembly 136 of the bone construct. Subsequent to the bone growing step 142, the interior bone regions are flood filled at step 144 to eliminate any remaining holes or gaps in the bone region, resulting in a bone mask 146. The bone mask 146 may then be excluded at step 148 from the image data 90. The remaining image data may then be volume rendered at step 150, such as by maximum intensity projection (MIP) or by other known techniques, to produce a bone-free volume rendering 152. The bone-free volume rendering may then be reviewed by a physician or radiologist for the purpose of diagnosing or treating a patient.

Figure 15:
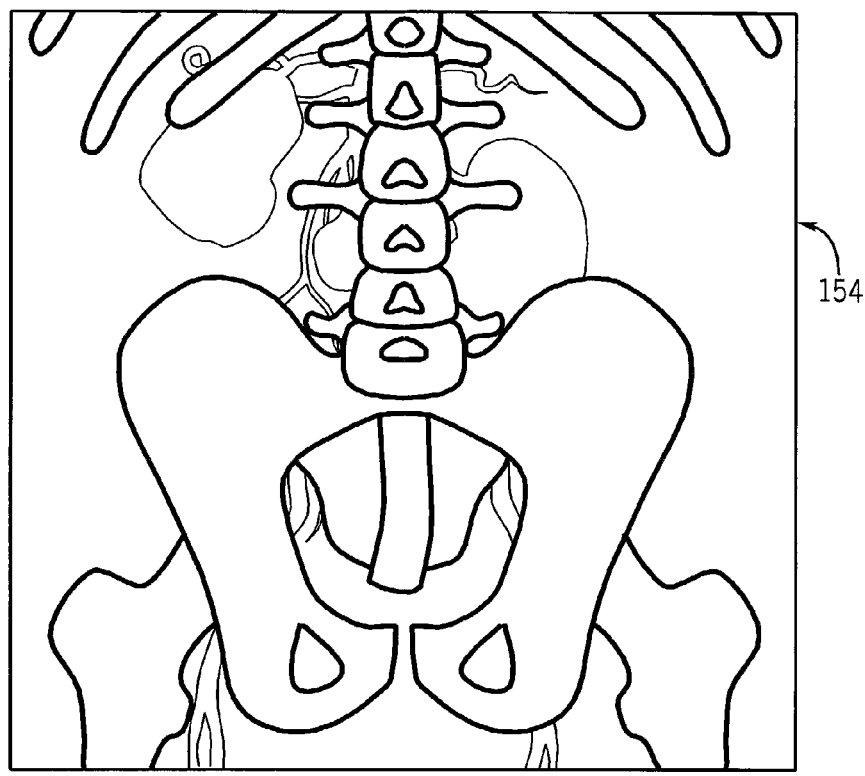
FIG. 15 is a two-dimensional representation of a coronal view of a human abdomen without automated bone masking.
Figure 16:
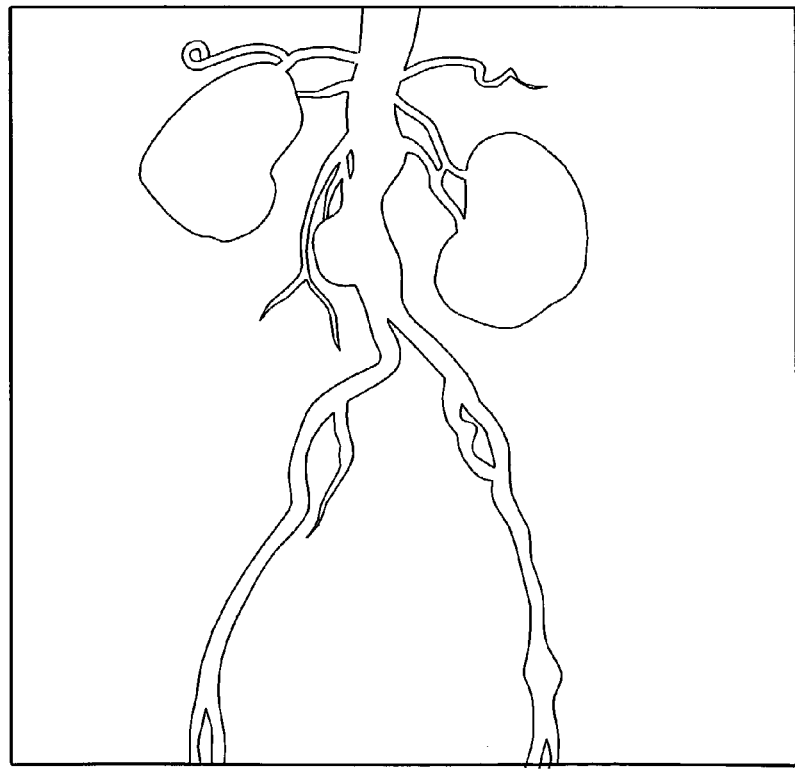
FIG. 16 is the representation of FIG. 15 after bone masking.

For example, referring now to FIG. 15, a CTA image including bone regions 154 is represented in which it can be seen that the bone regions obstruct the vascular regions to be studied. In FIG. 16, however, the bone regions are excluded by the technique described herein to form a bone-free volume rendering 152 (here shown in only two-dimensions) which allows easy viewing of the desired circulatory regions. Due to the automated nature of the bone segmentation and masking, a bone-free rendered volume 152 may be obtained in a near-real time, or potentially a real time, manner due to the absence of human intervention. Likewise, the robustness of the technique makes it useful for processing any data sets regardless of the presence or absence of pathologies.

Alternatively, the bone mask, or other structure mask, may be shown in varying degrees of opacity and translucence, such that the operator may fade the mask in and out of the volume rendering. In this manner, the operator may use the presence of the mask structure, such as the skeletal structure, to provide orientation and location information. Once oriented, however, the mask may be excluded to examine the structures of interest. In addition to configuring the translucence or opacity of the mask, the operator may be provided with the ability to increase or decrease the intensity, typically in the form of grey scale values, of the image in general or of certain parts of the image, such as the mask, in order to generate the desired rendering.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for automatically identifying one or more structural regions in a volume imaging slice, comprising:
   labeling two or more contiguous regions within a volume imaging slice to form a labeled slice, wherein at least one of the regions generally corresponds to a non-vascular region;
   flood-filling the interior of each region of the labeled slice to form a flood-filled slice;
   computing a distance map of each region of the flood-filled slice;
   computing one or more statistics for each region using at least one of the volume imaging slice, the distance map, or the flood-filled slice; and
   applying a rule-based classifier to the one or more statistics for each region to classify each region as one of bone, vessel, or indeterminate.

2. The method as recited in claim 1, further comprising excluding soft tissue from the volume imaging slice.

3. The method as recited in claim 2, further comprising excluding small islands from the volume imaging slice.

4. The method as recited in claim 1, further comprising removing one or more connections between at least one bone region and at least one vessel region.

5. The method as recited in claim 1, wherein at least one vessel region includes at least one of a contrast-enhancing agent, a contrast-enhancing pathology, or an interventional device which create an image intensity in the vessel region which overlaps the image intensity of at least one bone region.

6. The method as recited in claim 1, further comprising:
   constructing a three-dimensional vascular region map by analyzing at least one vessel region in a first image slice in relation to at least one vessel region in one or more proximate image slices; and
   constructing a three-dimensional bone region map by analyzing at least one bone region in the first image slice in relation to at least one bone region in one or more proximate image slices, wherein the voxels comprising the three-dimensional vascular region map are excluded from the three-dimensional bone region map and wherein voxels exceeding an image intensity threshold in the respective volume imagining slice are included in the three-dimensional bone region map.

7. The method as recited in claim 6, wherein the three-dimensional vascular region map includes a buffer zone extending outward from each vessel region.

8. The method as recited in claim 6, further comprising flood-filling the interior of the three-dimensional bone region map to form a bone mask.

9. The method as recited in claim 8, further comprising:
   excluding the bone mask from an initial volume data set comprising two or more volume image slices to form a difference volume data set; and
   applying a volume rendering technique to the difference volume data set to form a bone-free volume rendering.

10. The method as recited in claim 8, further comprising: varying the opacity of the bone mask in a volume rendering in response to an operator input.

11. A method for automatically classifying a region, comprising:
    applying a rule-based classifier to a set of statistics derived for a region of an image slice, wherein the rule-based classifier classifies the region as one of bone, vessel, or indeterminate and wherein the set of statistics comprises at least one of an area, a mean intensity, a standard deviation of intensity, a growth factor, a mean intensity associated with the periphery of the region, a mean intensity associated with the interior of the region, a standard deviation of intensity associated with the periphery of the region, a standard deviation of intensity associated with the interior of the region, an intensity covariance, a maximum intensity, a percentage of voxels exceeding a threshold intensity, a mean radius of the region or a standard deviation of the radius of the region.

12. The method as recited in claim 11, wherein the rule-based classifier discriminates between an interventional device in a vessel region and a bone region.

13. The method as recited in claim 11, wherein the rule-based classifier discriminates between a calcification in a vessel region and a bone region.

14. The method as recited in claim 11, wherein the rule-based classifier classifies the region as a vessel based upon one or more statistics related to at least one of the size of the region, the circularity of the region, or the intensity covariance within the region.

15. The method as recited in claim 11, wherein the rule-based classifier classifies the region as a bone based upon one or more statistics related to at least one of a standard deviation of intensity for the region, a high mean intensity associated with a low standard deviation of intensity along a periphery of the region, a covariance of intensity for the region, or a low standard deviation of intensity for the region associated with a percentage of calcification above a threshold value.

16. The method as recited in claim 11, wherein the rule-based classifier excludes the region from classification as bone when a measure of area for the region is below a size threshold.

17. The method as recited in claim 11, wherein the rule-based classifier applies one or more bone identification criteria to the set of statistics to classify the region as bone.

18. The method as recited in claim 11, wherein the rule-based classifier applies one or more vessel identification criteria to the set of statistics to classify the region as vessel.

19. A method for constructing a three-dimensional bone map, comprising:
identifying one or more bone-labeled regions in a plurality of image slices;
performing a connectivity analysis for the one or more bone-labeled regions in each image slice to determine if each bone-labeled region in the image slice is connected to a respective region in one or more proximate slices;
automatically re-classifying bone-labeled regions which fail the connectivity analysis as non-bone regions; and
constructing a three-dimensional bone map comprising the remaining bone-labeled regions.

20. The method as recited in claim 19, wherein the connectivity analysis assesses the connectivity of a bone-labeled region in view of the classification of a neighboring region in an adjacent slice such that a classification agreement between the regions indicates connectivity.

21. The method as recited in claim 19, wherein the connectivity analysis assesses the connectivity of the bone-labeled region in view of a classification of a neighboring region in an adjacent slice such that a classification disparity between the regions indicates erroneous classification of the bone-labeled region.

22. The method as recited in claim 19, further comprising:
identifying one or more high-intensity regions in the plurality of image slices;
performing the connectivity analysis for the one or more high-intensity regions in each image slice to determine if each high-intensity region in the image slice is connected to a respective region in one or more proximate slices; and
classifying the high-intensity regions which pass the connectivity analysis as bone-labeled regions.

23. The method as recited in claim 19, further comprising excluding one or more regions previously labeled as vessel regions from the plurality of image slices.

24. The method as recited in claim 19, further comprising expanding the three-dimensional bone map to encompass one or more probable bone regions.

25. The method as recited in claim 19, further comprising flood-filling an interior space of the three-dimensional bone map.

26. The method as recited in claim 25, further comprising forming a bone mask from the three-dimensional bone map.

27. A CT imaging system, comprising:
an X-ray source configured to emit a stream of radiation;
a detector array configured to detect the stream of radiation;
a system controller comprising an X-ray controller, a motor controller, and a data acquisition system, wherein the system controller controls the X-ray source and receives signal data from the detector array; and
a computer operably connected to the system controller and to memory circuitry;
wherein at least one of the system controller or the computer is configured to label two or more contiguous regions within a volume imaging slice, wherein at least one of the regions generally corresponds to a non-vascular region, to flood-fill the interior of each labeled region, to compute a distance map of each flood-filled region, to compute one or more statistics for each region using at least one of the volume imaging slice, the distance map, or the flood-filled region, and to apply a rule-based classifier to the one or more statistics for each region to classify each region as one of bone, vessel, or indeterminate.

28. The CT imaging system as recited in claim 27, wherein at least one of the system controller or the computer is further configured to exclude soft tissue from the volume imaging slice.

29. The CT imaging system as recited in claim 28, wherein at least one of the system controller or the computer is further configured to exclude small islands from the volume imaging slice.

30. The CT imaging system as recited in claim 27, wherein at least one of the system controller or the computer is further configured to remove one or more connections between at least one bone region and at least one vessel region.

31. The CT imaging system as recited in claim 27, wherein at least one of the system controller or the computer is further configured to construct a three-dimensional vascular region map by analyzing at least one vessel region in a first image slice in relation to at least one vessel region in one or more proximate image slices and to construct a three-dimensional bone region map by analyzing at least one bone region in the first image slice in relation to at least one bone region in one or more proximate image slices, wherein the voxels comprising the three-dimensional vascular region map are excluded from the three-dimensional bone region map and wherein voxels exceeding an image intensity threshold in the respective volume imagining slice are included in the three-dimensional bone region map.

32. The CT imaging system as recited in claim 31, wherein at least one of the system controller or the computer is further configured to flood-fill the interior of the three-dimensional bone region map to form a bone mask.

33. The CT imaging system as recited in claim 31, wherein at least one of the system controller or the computer is further configured to exclude the bone mask from an initial volume data set comprising two or more volume image slices to form a difference volume data set and to apply a volume rendering technique to the difference volume data set to form a bone-free volume rendering.

34. The CT imaging system as recited in claim 31, wherein at least one of the system controller or the computer is further configured to vary the opacity of the bone mask in a volume rendering in response to an operator input.

35. A CT imaging system, comprising:
an X-ray source configured to emit a stream of radiation;
a detector array configured to detect the stream of radiation;
a system controller comprising an X-ray controller, a motor controller, and a data acquisition system, wherein the system controller controls the X-ray source and receives signal data from the detector array; and
a computer operably connected to the system controller and to memory circuitry;
wherein at least one of the system controller or the computer is configured to apply a rule-based classifier to a set of statistics derived for a region of an image slice, wherein the rule-based classifier classifies the region as one of bone, vessel, or indeterminate.

36. The CT imaging system as recited in claim 35, wherein the rule-based classifier discriminates between an interventional device in a vessel region and a bone region.

37. The CT imaging system as recited in claim 35, wherein the rule-based classifier discriminates between a calcification in a vessel region and a bone region.

38. The CT imaging system as recited in claim 35, wherein the set of statistics for the region comprises at least one of an area, a mean intensity, a standard deviation of intensity, a growth factor, a mean intensity associated with the periphery of the region, a mean intensity associated with the interior of the region, a standard deviation of intensity associated with the periphery of the region, a standard deviation of intensity associated with the interior of the region, an intensity covariance, a maximum intensity, a percentage of voxels exceeding a threshold intensity, a mean radius of the region or a standard deviation of the radius of the region.

39. The CT imaging system as recited in claim 35, wherein the rule-based classifier classifies the region as a vascular structure based upon one or more statistics related to at least one of the size of the region, the circularity of the region, or the intensity covariance within the region.

40. The CT imaging system as recited in claim 35, wherein the rule-based classifier classifies the region as a bone based upon one or more statistics related to at least one of a standard deviation of intensity for the region, a high mean intensity associated with a low standard deviation of intensity along a periphery of the region, a covariance of intensity for the region, or a low standard deviation of intensity for the region associated with a percentage of calcification above a threshold value.

41. The CT imaging system as recited in claim 35, wherein the rule-based classifier excludes the region from classification as bone when a measure of area for the region is below a size threshold.

42. A CT imaging system, comprising:
an X-ray source configured to emit a stream of radiation;
a detector array configured to detect the stream of radiation;
a system controller comprising an X-ray controller, a motor controller, and a data acquisition system, wherein the system controller controls the X-ray source and receives signal data from the detector array; and
a computer operably connected to the system controller and to memory circuitry;
wherein at least one of the system controller or the computer is configured to identify one or more bone-labeled regions in a plurality of image slices, to perform a connectivity analysis for the one or more bone-labeled regions in each image slice to determine if each bone-labeled region in the image slice is connected to a respective region in one or more proximate slices, to automatically re-classify bone-labeled regions which fail the connectivity analysis as non-bone regions, and to construct a three-dimensional bone map comprising the remaining bone-labeled regions.

43. The CT imaging system of claim 42, wherein the connectivity analysis assesses the connectivity of a bone-labeled region in view of the classification of a neighboring region in an adjacent slice such that a classification agreement between the regions indicates connectivity.

44. The CT imaging system of claim 42, wherein the connectivity analysis assesses the classification of the bone-labeled region in view of a classification of a neighboring region in an adjacent slice such that a classification disparity between the regions indicates erroneous classification of the bone-labeled region.

45. The CT imaging system of claim 42, wherein at least one of the system controller or the computer is further configured to identify one or more high-intensity regions in the plurality of image slices, to perform the connectivity analysis for the one or more high-intensity regions in each image slice to determine if each high-intensity region in the image slice is connected to a respective region in one or more proximate slices, and to classify the high-intensity regions which pass the connectivity analysis as bone-labeled regions.

46. The CT imaging system of claim 42, wherein at least one of the system controller or the computer is further configured to exclude one or more regions previously labeled as vessel regions from the plurality of image slices.

47. The CT imaging system of claim 42, wherein at least one of the system controller or the computer is further configured to expand the three-dimensional bone map to encompass one or more probable bone regions.

48. The CT imaging system of claim 42, wherein at least one of the system controller or the computer is further configured to flood-fill an interior space of the three-dimensional bone map.

49. The CT imaging system of claim 48, wherein at least one of the system controller or the computer is further configured to form a bone mask from the three-dimensional bone map.

50. A CT imaging system, comprising:
means for labeling two or more contiguous regions within a volume imaging slice to form a labeled slice, wherein at least one of the regions generally corresponds to a non-vascular region;
means for flood-filling the interior of each region of the labeled slice to form a flood-filled slice;
means for computing a distance map of each region of the flood-filled slice;

means for computing one or more statistics for each region using at least one of the volume imaging slice, the distance map, or the flood-filled slice; and means for applying a rule-based classifier to the one or more statistics for each region to classify each region as one of bone, vessel, or indeterminate.

51. The CT imaging system as recited in claim 50, comprising:

means for constructing a three-dimensional vascular region map by analyzing at least one vessel region in a first image slice in relation to at least one vessel region in one or more proximate image slices; and means for constructing a three-dimensional bone region map by analyzing at least one bone region in the first image slice in relation to at least one bone region in one or more proximate image slices, wherein the voxels comprising the three-dimensional vascular region map are excluded from the three-dimensional bone region map and wherein voxels exceeding an image intensity threshold in the respective volume imagining slice are included in the three-dimensional bone region map.

52. The CT imaging system as recited in claim 51, comprising:

means for flood-filling the interior of the three-dimensional bone region map to form a bone mask;

means for excluding the bone mask from an initial volume data set comprising two or more volume image slices to form a difference volume data set; and means for applying a volume rendering technique to the difference volume data set to form a bone-free volume rendering.

53. A CT imaging system, comprising:

an X-ray source configured to emit a stream of radiation;

a detector array configured to detect the stream of radiation;

a system controller comprising an X-ray controller, a motor controller, and a data acquisition system, wherein the system controller controls the X-ray source and receives signal data from the detector array;

a computer operably connected to the system controller and to memory circuitry; and means for applying rule-based classifier to a set of statistics derived for a region of an image slice, wherein the rule-based classifier the region as one of bone, vessel, or indeterminate.

54. A CT imaging system, comprising:

means for identifying one or more bone-labeled regions in a plurality of image slices;

means for performing a connectivity analysis for the one or more bone-labeled regions in each image slice to determine if each bone-labeled region in the image slice is connected to a respective region in one or more proximate slices;

means for automatically re-classifying bone-labeled regions which fail the connectivity analysis as non-bone regions; and means for constructing a three-dimensional bone map comprising the remaining bone-labeled regions.

55. The CT imaging system as recited in claim 54, comprising:

means for identifying one or more high-intensity regions in the plurality of image slices;

means for performing the connectivity analysis for the one or more high-intensity regions in each image slice to determine if each high-intensity region in the image slice is connected to a respective region in one or more proximate slices; and means for classifying the high-intensity regions which pass the connectivity analysis as bone-labeled regions.

56. The CT imaging system as recited in claim 54, comprising:

means for expanding the three-dimensional bone map to encompass one or more probable bone regions.

57. One or more computer readable media comprising routines for automatically identifying one or more structural regions in a volume imaging slice, comprising:

a routine for labeling two or more contiguous regions within a volume imaging slice to form a labeled slice, wherein at least one of the regions generally corresponds to a non-vascular region;

a routine for flood-filling the interior of each region of the labeled slice to form a flood-filled slice;

a routine for computing a distance map of each region of the flood-filled slice;

a routine for computing one or more statistics for each region using at least one of the volume imaging slice, the distance map, or the flood-filled slice; and a routine for applying a rule-based classifier to the one or more statistics for each region to classify each region as one of bone, vessel, or indeterminate.

58. The one or more computer readable media as recited in claim 57, further comprising a routine for excluding soft tissue from the volume imaging slice.

59. The one or more computer readable media as recited in claim 58, further comprising a routine for excluding small islands from the volume imaging slice.

60. The one or more computer readable media as recited in claim 57, further comprising a routine for removing one or more connections between at least one bone region and at least one vessel region.

61. The one or more computer readable media as recited in claim 57, further comprising:

a routine for constructing a three-dimensional vascular region map by analyzing at least one vessel region in a first image slice in relation to at least one vessel region in one or more proximate image slices; and a routine for constructing a three-dimensional bone region map by analyzing at least one bone region in the first image slice in relation to at least one bone region in one or more proximate image slices, wherein the voxels comprising the three-dimensional vascular region map are excluded from the three-dimensional bone region map and wherein voxels exceeding an image intensity threshold in the respective volume imagining slice are included in the three-dimensional bone region map.

62. The one or more computer readable media as recited in claim 61, further comprising a routine for flood-filling the interior of the three-dimensional bone region map to form a bone mask.

63. The one or more computer readable media as recited in claim 62, further comprising:

a routine for excluding the bone mask from an initial volume data set comprising two or more volume image slices to form a difference volume data set; and a routine for applying a volume rendering technique to the difference volume data set to form a bone-free volume rendering.

64. The one or more computer readable media as recited in claim 62, further comprising:

a routine for varying the opacity of the bone mask in a volume rendering in response to an operator input.

65. One or more computer readable media comprising routines for automatically classifying a region comprising:

A routine for applying a rule-based classifier to a set of statistics derived for a region of an image slice, wherein the rule-based classifier classifies the region as one of bone, vessel, or indeterminate and wherein the set of statistics for the region comprises at least one of an area, a mean intensity, a standard deviation of intensity, a growth factor, a mean intensity associated with the periphery of the region, a mean intensity associated with the interior of the region, a standard deviation of intensity associated with the periphery of the region, a standard deviation of intensity associated with the interior of the region, an intensity covariance, a maximum intensity, a percentage of voxels exceeding a threshold intensity, a mean radius of the region or a standard deviation of the radius of the region.

66. The one or more computer readable media as recited in claim 65, wherein the rule-based classifier discriminates between an interventional device in a vessel region and a bone region.

67. The one or more computer readable media as recited in claim 65, wherein the rule-based classifier discriminates between a calcification in a vessel region and a bone region.

68. The one or more computer readable media as recited in claim 65, wherein the rule-based classifier classifies the region as a vascular structure based upon one or more statistics related to at least one of the size of the region, the circularity of the region, or the intensity covariance within the region.

69. The one or more computer readable media as recited in claim 65, wherein the rule-based classifier classifies the region as a bone based upon one or more statistics related to at least one of a standard deviation of intensity for the region, a high mean intensity associated with a low standard deviation of intensity along a periphery of the region, a covariance of intensity for the region, or a low standard deviation of intensity for the region associated with a percentage of calcification above a threshold value.

70. The medium as recited in claim 65, wherein the rule-based classifier excludes the region from classification as bone when a measure of area for the region is below a size threshold.

71. One or more computer readable media comprising routines for constructing a three-dimensional bone map, comprising:

a routine for identifying one or more bone-labeled regions in a plurality of image slices;

a routine for performing a connectivity analysis for the one or more bone-labeled regions in each image slice to determine if each bone-labeled region in the image slice is connected to a respective region in one or more proximate slices;

a routine for automatically re-classifying bone-labeled regions which fail the connectivity analysis as non-bone regions; and a routine for constructing a three-dimensional bone map comprising the remaining bone-labeled regions.

72. The one or more computer readable media as recited in claim 71, further comprising:

a routine for identifying one or more high-intensity regions in the plurality of image slices;

a routine for performing the connectivity analysis for the one or more high-intensity regions in each image slice to determine if each high-intensity region in the image slice is connected to a respective region in one or more proximate slices; and a routine for classifying the high-intensity regions which pass the connectivity analysis as bone-labeled regions.

73. The one or more computer readable media as recited in claim 71, further comprising a routine for excluding one or more regions previously labeled as vessel regions from the plurality of image slices.

74. The one or more computer readable media as recited in claim 71, further comprising a routine for growing the three-dimensional bone map to encompass one or more probable bone regions.

75. The one or more computer readable media as recited in claim 71, further comprising a routine for flood-filling an interior space of the three-dimensional bone map.

76. The one or more computer readable media as recited in claim 75, further comprising forming a bone mask from the three-dimensional bone map.

\* \* \* \* \*